United States Patent
Buhne

[15] 3,692,058
[45] Sept. 19, 1972

[54] DUAL-STAGE VALVE
[72] Inventor: Klaus Buhne, Gummersbach, Germany
[73] Assignee: Dr. Hermann E. Muller Metallwarenfabrik Bergneustadt GmbH, Bergneustadt, Bez, Cologne, Germany
[22] Filed: Sept. 9, 1969
[21] Appl. No.: 856,368

[30] Foreign Application Priority Data
Sept. 11, 1968 Germany..........P 17 80 398.4

[52] U.S. Cl............................137/627.5, 137/596.2
[51] Int. Cl. .........................F16k 11/22, F16k 31/12
[58] Field of Search...137/596.2, 627.5, 630.19, 636, 137/625.27, 630.16

[56] References Cited
UNITED STATES PATENTS
2,152,084  3/1939  Paine.................137/625.27 X
2,935,092  5/1960  Stoner..................137/608 X
3,151,624  10/1964  Koutnik..............137/627.5 X Primary Examiner—M. Cary Nelson
Assistant Examiner—Robert J. Miller
Attorney—Michael S. Striker

[57] ABSTRACT

A dual-stage valve for braking-force amplifiers in vehicle braking systems and the like. A valve housing has opposite ends. An elongated valve control member is shiftable in this housing in direction towards one of the ends and has an axis which extends in this direction. A pair of valve members each fluid-tightly surround the valve control member and are slidable in direction towards and away from the respective ends. A biassing spring biasses the valve members apart along the axis of the valve control member. Limiting means on the valve control members limits axial movement of the valve members apart under the influence of the biassing spring. Shifting means serves to shift the valve control member in direction from one towards the other of the ends of the housing. A second biassing spring opposes this shifting movement.

8 Claims, 2 Drawing Figures 3,692,058

INVENTOR:
KLAUS BÜHNE
BY
ATTORNEY

3,692,058

DUAL-STAGE VALVE

BACKGROUND OF THE INVENTION

The present invention relates to valves, and more particularly to dual-stage valves. Still more specifically the invention relates to a dual-stage valve for pneumatic and hydraulic pressure-transmission systems, in particular for braking-force amplifiers in vehicle braking systems.

In servo brake mechanisms it is known to provide valves which, when they are in a rest position, separates the pressure chamber from the pressure source but establish communication between the pressure chamber and the under-pressure chamber. In a first working position or stage of the valve the connection between the pressure source, the pressure chamber and the underpressure chamber is completely interrupted while in a second operating position or stage of the valve the pressure source is connected with the pressure chamber. Usually these valves as known from the prior art comprise a slide member which, when it moves longitudinally, opens or closes the channels or ports between which communication is to be established or terminated. In order to obtain the dual-stage operation of the valve, the slide members are frequently of telescopic construction wherein one section of the slide member is telescopically slidable within a second section. Alternately, the slide member may cooperate with one or several diaphragms. All of these constructions, however, require great manufacturing precision, as well as great precision in their operation. Because of this they are not only difficult to manufacture and therefore expensive, but also subject to breakdowns. In order to provide fluid channels which are as short as possible, the valve is usually arranged in the central portion of the braking-force amplifying device, and this makes it difficult to gain access to the valve for inspection or service, resulting in time losses and high expenses for such operations. Again, it is necessary in these constructions to supply lubricants to the surfaces which slide upon one another in these valve constructions, and this further increases the complicated construction of the valves and their expense because special supply means must be provided for this purpose.

Attempts to overcome the problems associated with gaining access to the valve for inspection and servicing have involved the arrangement of the valve exteriorly of the braking-force amplifying device. However, this has been found to be undesirable because of necessity in such a construction the fluid channels of the device must then be considerably longer and this leads to delays in the operation of the device.

Other attempts are known from the art to simplify the construction of dual-stage valves for this type of application, and to make their operation more reliable and less subject to breakdown. However, none have been found entirely satisfactory for various reasons known well to those skilled in the art.

SUMMARY OF THE INVENTION

It is, accordingly, a general object of the present invention to provide a dual-stage valve for use in pneumatic and hydraulic pressure-transmission systems, particularly in braking-force boosters in vehicle braking systems, which is not possessed of the aforementioned disadvantages.

A more particular object of the present invention is to provide such a valve which is very simple in its construction.

An additional object of the invention is to provide a valve of the type under discussion which, because of its simplicity, is highly reliable in its operation and largely free from breakdowns.

A concomitant object of the invention is to provide such a valve which is inexpensive because of its simplicity.

In pursuance of the above objects, and others which will become apparent hereafter, one feature of the invention resides, briefly stated, in a dual-stage valve of the type under discussion having a valve housing provided with opposite ends. An elongated valve control member is shiftable in this housing in direction towards one of the ends and has an axis which extends in this direction. A pair of valve members each fluid-tightly surround the valve control member in the housing and are slidable in direction towards and away from the respective ends. First biassing means biasses the valve members apart along the axis of the valve control member. Limiting means is provided on the valve control member for limiting the axial movement of the valve members relative to the valve control member under the influence of the first biassing means. Shifting means serves for shifting the valve control member in direction from the other towards the one end of the housing. Second biassing means is provided in the region of the one end and permanently urges the valve control member towards the other end.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
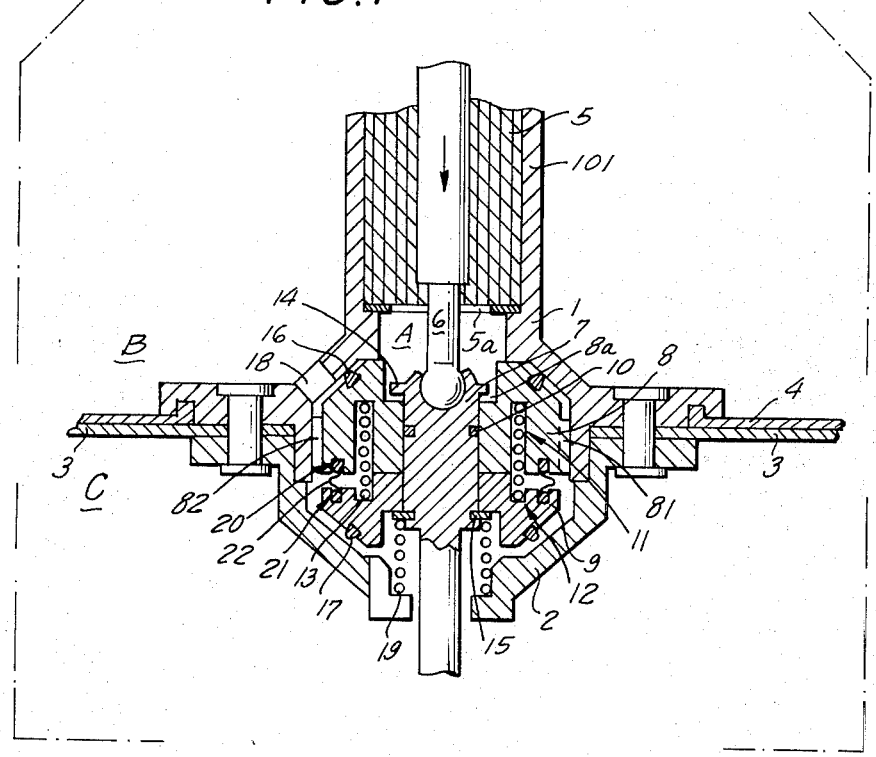
FIG. 1 is a diagrammatic sectioned view of a valve according to the present invention.

Discussing firstly the embodiment illustrated in FIG. 1, it will be seen that a valve housing of my novel dual-stage valve is composed of two sections which are respectively identified with reference numerals 1 and 2. The housing composed of the sections 1 and 2 is secured in suitable manner, for instance as illustrated, to the pneumatic piston 3 of a braking-force booster which is activated by underpressure in the engine of a vehicle with whose braking system the booster is associated. In usual manner the piston 3 is covered by an annular diaphragm 4 as shown. The valve housing 1, 2 is provided with an extension 101 accommodating an air filter 5.

It is emphasized that details of the construction of such braking-force boosters are well known to those skilled in the art, and that such details therefore have not been shown because they are not essential to an understanding of the present invention. The same is true of the air filter 5.

Accommodated in the interior of the valve housing is an elongated valve control member 7 which may be operatively associated in non-illustrated manner with a similarly non-illustrated indicating device, for instance on the dashboard of the vehicle. How this association is accomplished, and the details concerning the indicating device, form no part of the present invention.

The valve control member 7 is pivotably linked with a shifting means 6, here constituted by a member which in suitable manner is linked with the brake pedal of the vehicle and which will, when the brake pedal is depressed, perform movements in the direction of the arrow associated with the member 6. There are further accommodated within the valve housing 1, 2 the valve members 8 and 9 which are of annular configuration and which surround the valve control member 7, being axially arrayed thereon. A sealing ring 10 of known construction fluid-tightly seals the valve member 8 with respect to the valve control member 7.

Interposed between the valve members 8 and 9 is an expansion spring 13 which is located in annular grooves provided in the juxtaposed end faces of the valve members 8 and 9, as illustrated in FIG. 1. Because the spring 13 tends to expand in axial direction, it permanently biases the valve members 8 and 9 apart from one another, axially with reference to the valve control member 7. The latter, however, is provided at axially or longitudinally spaced locations with abutments 14 and 15 which may be of one piece with the valve control member 7, or which may be secured thereto in suitable manner. In any case, the abutments 14 and 15 constitute limiting means which serves to limit the movement of the valve members 8 and 9 in direction away from one another under the biasing influence of the spring 13.

As illustrated in FIG. 1, the outer diameter of the valve members 8 and 9 is smaller than the inner diameter of the chamber in the valve housing 1, 2. To assure that the valve members are properly guided for sliding movement, the outer circumference of the valve member 8 is provided with axially extending projections and recesses 81, 82. The recesses serve a further purpose, as will become evident hereafter.

There is further provided an annular sealing ring 16 on the valve member 8, and a similar annular sealing ring 17 on the valve member 9, in the illustrated locations. When the valve member 8 is in the position illustrated in FIG. 1, the sealing ring 16 abuts against the interior surface bounding the chamber in the valve housing 1, 2 to establish a seal therewith. Similarly, if the valve member 9 moves downwardly in FIG. 1, the sealing ring 17 will sealingly engage the inner surface of the chamber in the valve housing 1, 2. As pointed out before, the construction and operation of the braking-force boosters is well known to those skilled in the art. For this reason it is not illustrated or discussed in great detail herein. However, to facilitate understanding of the operation of the dual-stage valve according to the present invention, it is pointed out that the pneumatic piston 3 divides the interior of the pneumatic booster cylinder into a pressure chamber B and an underpressure chamber C. The latter is connected with the suction device of the engine so that it is constantly maintained at an underpressure of between 0.6 to substantially 0.8 atmospheres. Normally, that is when the booster is not in operation, the chambers B and C are connected with one another so that the chamber B is also at underpressure. Before the chamber B can be filled with air at atmospheric pressure when the brake is actuated and therefore the booster is operated, the connection between the chambers B and C must be interrupted because otherwise the braking operation would be delayed.

To assure that the chambers B and C are normally in communication with one another, that is they communicate with one another when the booster is not in operation, an expansion spring 19 is confined between one end of the valve housing—or more particularly one end of the housing section 2—and the abutment 15 on the valve control member 7, urging the latter and thus the valve members 8 and 9 upwardly as seen in FIG. 1, so that the sealing ring 16 on the valve member 8 is pressed sealingly against the inner surface of the chamber in the valve housing 1, 2. This is illustrated in FIG. 1 and it will be appreciated that the spring 19 must be strong enough to overcome the atmospheric pressure which acts upon the valve member 8. There is thus an annular clearance between the inner wall bounding the chamber in the valve housing and the outer circumference of the valve member 9 as well as that portion of the outer circumference of the valve member 8 which extends up to the sealing element 16. One or more apertures 18 in the valve housing section 1 (one shown) communicate with this annular clearance as well as with the chamber B, so that the latter is thus in communication with the chamber C which also communicates with the clearance as shown.

The chambers B and C have been outlined in chain lines in FIG. 1 for convenience in visualization, but with no attempt to accurately show their configuration because this does not constitute a part of the invention.

The valve according to the present invention is shown in FIG. 1 in the position which it assumes when the braking force booster is not in operation, that is when the brake pedal is not depressed. If, now, the brake pedal is depressed, the member 6 moves downwardly in the direction of the arrow and initially shifts the valve control member 7 in the same direction until the abutment 14 contacts the annular end face 8a of the valve member 8. At the same time, the abutment 15 compresses the spring 19 and thus enables the valve member 9 to move in the direction of the arrow under the urging of the spring 13, until the sealing element 17 sealingly engages the inner surface of the chamber in the valve housing 1, 2. This interrupts the continuity of the aforementioned annular clearance and the chambers B and C are now fluid-tightly separated from one another. The sealing element 16 is still in sealing engagement with the inner surface bounding the chamber in the valve housing 1, 2, that is in the position illustrated in FIG. 1, and therefore the chamber B is still separated from the chamber A which is in communication with the atmosphere via the opening 5a through which the element 6 extends, and via the air filter 5. Therefore, the chamber B is still at underpressure.

Further depressing of the brake pedal causes the element 6 to move further in the direction of the associated arrow. Because the abutment 14 is now in engagement with the end face 8a, the valve member 8 is displaced in the direction of the arrow and sealing engagement of the sealing element 16 with the inner surface bounding the chamber in the valve housing is terminated. This movement of the valve member 8 continues until it abuts against the valve member 9, against the opposition of the spring 13. There is now established communication between the chamber A and the chamber B via the port or ports 18, so that atmospheric air can flow from the chamber A into the chamber B which until such time had been at underpressure. The incoming atmospheric air now exerts pressure upon the pneumatic piston 3, displacing the same, and the piston 3 in turn displaces the main piston in the main brake cylinder. The operation of the piston 3 and of the main piston, and their association with one another, is well known and therefore not described herein.

To assure that no atmospheric air can enter between the valve members 8 and 9 and from there between valve member 9 and valve control member 7 into the underpressure chamber C, the juxtaposed end faces of the valve members 8 and 9 are provided with annular grooves which accommodate an annular sealing member, illustrated in FIG. 1 as composed of two annuli of sealing material each of which is received in one of the grooves 20, 21, and which are connected sealingly with one another by flexible sealing material; the fold indicated for this flexible sealing material must be such as to permit the maximum movement of the valve members 8 and 9 apart from one another. The sealing member 22 is suitably secured in the grooves 20, 21. While at first sight it might appear simpler to provide a sealing element analogous to the sealing element 10, but associated with the valve member 9, it is pointed out that this has not been found practicable because the frictional resistance to be overcome would then be too great for the desired operational characteristics of the valve.

Figure 2:
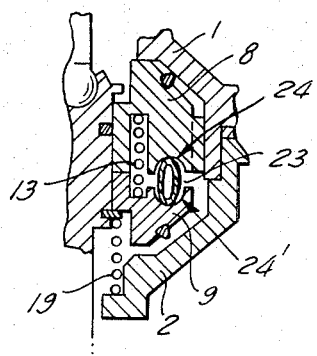
FIG. 2 is a fragmentary detail view of a valve analogous to the one shown in FIG. 1, but illustrating a further embodiment.

The embodiment illustrated in FIG. 2 differs from that of FIG. 1 only in that the sealing element 22 which prevents entry of atmospheric air between the valve members 8 and 9 has been omitted and replaced with a different one. Specifically, in FIG. 2 the configuration of the grooves 24 and 24'—corresponding to the grooves 20 and 21 in FIG. 1—is of semi-circular cross-section and the sealing member 23 is a hose-like element of sealing material, for instance elastomeric material, which is received and suitably secured in these grooves 24, 24'—for instance by adhesive means or in other suitable manner—and which serves the same purpose as the sealing element 22 in FIG. 1. Evidently, the cross-sectional configuration of the sealing element 23, which is shown in FIG. 2 as being oval, could be different as long as it provides the desired sealing function.

Finally, it has been mentioned earlier that in addition to the guide function the presence of the projections 81 and grooves 82 in the outer circumference of the valve member 8 fulfills an additional purpose. Merely for the sake of completeness—because this second purpose is of course evident from the disclosure given above—it is pointed out that communication between the chambers C and B is established when the valve is in the position shown in FIG. 1, via the annular clearance which is shown, and of course the presence of the grooves 82 is necessary because they provide the continuity which establishes communication with the port or ports 18, because without them the annular clearance would evidently end at the end face of the valve member 8 which is provided with the groove 20.

The advantages of the construction according to the present invention will be obvious. Summarizing, it may be said that the novel valve is simple and compact in its construction. Furthermore, it may be made of inexpensive components manufactured from synthetic plastic material. Because its operation is very simple, also, the valve is almost virtually free from breakdown problems over extended periods of time and requires little or no service. The valve contains no components which perform significant sliding movements relative to one another and avoids the frictional problems which exist in other valves of this general type as a result of the internal sealing means used therein. Finally, the valve according to the present invention is arranged directly at the piston 3 and moves with the same so that the flow passages for the pressure fluid—that is for the atmospheric air in the illustrated example—are exceedingly short and guarantee almost instantaneous booster action.

It will be understood that each of the elements described above, or two or more together may also find a useful application in other types of constructions differing from the types described above.

While the invention has been illustrated and described as embodied in a dual-stage valve for pressure-transmission systems, it is not intended to be limited to the details shown, since various modifications and structural changes may be made without departing in any way from the spirit of the present invention.

I claim:

1. A dual-stage valve for fluid pressure transmission systems, particularly for braking-force boosters in vehicle braking systems, comprising a valve housing having opposite ends; an elongated valve control member shiftable in said housing in direction towards one of said ends and having an axis extending in said direction; a pair of axially adjacent valve members each fluid-tightly surrounding said valve control member in said housing, slidable in direction towards and away from the respective ends; first biassing means biassing said valve members apart along said axis; limiting means on said valve control member for limiting axial movement of said valve members relative to said valve control member under the influence of said first biassing means; shifting means for shifting said valve control member in direction from the other end towards said one end; second biassing means in the region of said one end and permanently urging said valve control member towards said other end; and sealing means encircling said valve control member intermediate and sealingly engaging said valve members in all relative positions of the latter.

2. A valve as defined in claim 1, said valve members each having an outer circumferential surface and said valve housing having an inner circumferential surface; and additional sealing means on said valve members extending circumferentially of the respective outer circumferential surfaces thereof and arranged for sealing engagement with said inner circumferential surface in response to requisite movement of the respective valve members.

3. A valve as defined in claim 2; and further comprising recess means provided in said outer circumferential surface of at least one of said valve members intermediate said additional sealing means.

4. A valve as defined in claim 1, said valve members being annular and having respective juxtaposed end faces extending radially of said valve control member; and said sealing means comprising an annular flexible element interposed between and connected to both of said end faces, and surrounding said valve control member radially outwardly thereof.

5. A valve as defined in claim 2, wherein said additional sealing means of one of said valve members is normally in engagement with said inner circumferential surface in the region of said other end and wherein said additional sealing means of the other valve member is normally out of engagement with said inner circumferential surface; and wherein said housing comprises a first section having said other end and accommodating said one valve member, said one section being normally at atmospheric pressure so that said one valve member is subjected to such atmospheric pressure and a second section having said one end and accommodating the other valve member, said second section being normally at under-pressure, said first section and said second section normally communicating with one another.

6. A valve as defined in claim 5, said limiting means comprising abutments provided at opposite end portions of said valve control member, said additional sealing means of said other valve member being normally spaced from said inner circumferential surface by a predetermined distance, and said valve members together having a predetermined axial length; and wherein said abutments at said opposite end portions of said valve control member are spaced from one another by a spacing which exceeds said predetermined axial length substantially by said predetermined distance.

7. A valve as defined in claim 4, said end faces each being provided with circumferentially extending recesses and said recesses registering with each other; and wherein said annular flexible element is received and secured in said registering annular recess.

8. A valve as defined in claim 4, wherein said annular flexible element is a hose.

* * * * *